US010966097B2

United States Patent
Al-Fanek et al.

(10) Patent No.: US 10,966,097 B2
(45) Date of Patent: Mar. 30, 2021

(54) MONITOR AND PREDICT WI-FI UTILIZATION PATTERNS FOR DYNAMIC OPTIMIZATION OF THE OPERATING PARAMETERS OF NEARBY ENBS USING THE SAME UNLICENSED SPECTRUM

(71) Applicant: Telefonaktiebolaget LM Ericsson (publ), Stockholm (SE)

(72) Inventors: Issa Al-Fanek, Montreal (CA); Havish Koorapaty, Saratoga, CA (US); Meral Shirazipour, Santa Clara, CA (US); Heikki Mahkonen, San Jose, CA (US); Ravi Manghirmalani, Fremont, CA (US)

( * ) Notice: Subject to any disclaimer, the term of this patent is extended or adjusted under 35 U.S.C. 154(b) by 94 days.

(21) Appl. No.: 16/075,378

(22) PCT Filed: Feb. 5, 2016

(86) PCT No.: PCT/IB2016/050618
§ 371 (c)(1),
(2) Date: Aug. 3, 2018

(87) PCT Pub. No.: WO2017/134490
PCT Pub. Date: Aug. 10, 2017

(65) Prior Publication Data
US 2019/0045370 A1 Feb. 7, 2019

(51) Int. Cl.
*H04W 16/14* (2009.01)
*H04W 16/18* (2009.01)
(Continued)

(52) U.S. Cl.
CPC ............ *H04W 16/14* (2013.01); *H04L 43/12* (2013.01); *H04W 16/18* (2013.01); *H04W 24/02* (2013.01);
(Continued)

(58) Field of Classification Search
CPC ..... H04W 16/14; H04W 16/18; H04W 24/02; H04W 24/08; H04W 72/082; H04W 74/0816; H04W 88/10; H04L 43/12
See application file for complete search history.

(56) References Cited

U.S. PATENT DOCUMENTS

| 8,984,490 B1 | 3/2015 | Dahan |
| 9,009,305 B1 * | 4/2015 | Callau ..................... H04L 29/06 370/230 |

(Continued)

OTHER PUBLICATIONS

Andreoli-Fang, et al., "Can LTE-U Forum Specification Provide Fair Coexistence?," CableLabs, https://wwwm.cablelabs.com/can-lte-u-forum-specification-provide-fair-coexistence/, Sep. 22, 2015, 5 pages.

(Continued)

*Primary Examiner* — Melvin C Marcelo
(74) *Attorney, Agent, or Firm* — NDWE, LLP

(57) ABSTRACT

A method is implemented by a network device for determining parameter values for a base station of a cellular network. The base station operates in a wireless band that is shared with one or more wireless access points. The parameter values are determined to optimize network performance while ensuring fair coexistence between the base station and the one or more wireless access points. The method includes obtaining proximity information for the one or more wireless access points relative to the base station, obtaining activity information for the one or more wireless access points, and determining parameter values for the base station based on the proximity information and the activity information.

8 Claims, 10 Drawing Sheets

(51) Int. Cl.
H04W 24/08 (2009.01)
H04W 72/08 (2009.01)
H04W 88/10 (2009.01)
H04W 74/08 (2009.01)
H04W 24/02 (2009.01)
H04L 12/26 (2006.01)

(52) U.S. Cl.
CPC ......... *H04W 24/08* (2013.01); *H04W 72/082* (2013.01); *H04W 74/0816* (2013.01); *H04W 88/10* (2013.01)

(56) References Cited

U.S. PATENT DOCUMENTS

| | | | |
|---|---|---|---|
| 9,471,391 | B1 | 10/2016 | Abramson et al. |
| 9,853,877 | B2 | 12/2017 | Manghirmalani et al. |
| 2007/0177518 | A1 | 8/2007 | Li et al. |
| 2008/0232269 | A1 | 9/2008 | Tatman et al. |
| 2009/0135727 | A1 | 5/2009 | Agrawal et al. |
| 2010/0030792 | A1 | 2/2010 | Swinton et al. |
| 2011/0310815 | A1* | 12/2011 | Kim ............... H04W 24/00 370/329 |
| 2013/0132564 | A1 | 5/2013 | Ciordas et al. |
| 2013/0343288 | A1 | 12/2013 | Ratasuk et al. |
| 2014/0289412 | A1 | 9/2014 | Doddavula et al. |
| 2015/0099525 | A1 | 4/2015 | Ji et al. |
| 2015/0288809 | A1 | 10/2015 | Liang et al. |
| 2015/0327328 | A1 | 11/2015 | Novak et al. |
| 2015/0351115 | A1 | 12/2015 | Jeon et al. |
| 2016/0006640 | A1 | 1/2016 | Masuda et al. |
| 2016/0073405 | A1* | 3/2016 | Khawer ............ H04L 5/0007 370/329 |
| 2016/0278088 | A1* | 9/2016 | Cheng ............... H04L 47/27 |

OTHER PUBLICATIONS

Bitar, et al., "Interface to the Routing System (I2RS) for Service Chaining: Use Cases and Requirements," draft-bitar-i2rs-service-chaining-01.txt, Internet Engineering Task Force, IETF, Standard Working Draft, Internet Society (ISOC) 4, Rue Des Falaises CH-1205 Genev, XP015096866, Feb. 14, 2014 (Feb. 14, 2014), pp. 1-15.
Dunbar, et al., "An Information Model for Filter Rules for Discovery and Traffic for I2RS Filter-Based RIB," draft-dunbar-i2rs-discover-traffic-rules-00.txt, Internet Engineering Task Force, IETF, Standard Working Draft, Internet Society (ISOC) 4, Rue Des Falaises CH-1, XP015105668, Mar. 24, 2015 (Mar. 24, 2015), pp. 1-25.
Fan, "Network on the move," Ericsson Research Blog, Ericsson AB, https://www.ericsson.com/research-blog/network-on-the-move/#more-2309, Jun. 18, 2015, 5 pages.
FCC Public Notice, "Office of Engineering and Technology and Wireless Telecommunications Bureau Seek Information on Current Trends in LTE-U and LAA Technology," DA 15-516, ET Docket No. 15-105, Federal Communications Commission, May 5, 2015, 3 pages.
Halpern, et al., "Service Function Chaining (SFC) Architecture", IETF Network Working Draft, draft-ieft-sfc-architecture-05, IETF Trust and the persons identified as the document authors,Feb. 17, 2015, pp. 1-27.
IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.
IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
IEEE Std 802.15.1™-2002, "Part 15.1: Wireless Medium Access Control (MAC) and Physical Layer (PHY) Specifications for Wireless Personal Area Networks (WPANs)," IEEE Standard for Information technology—Telecommunications and information exchange between systems—Local and metropolitan area networks—Specific requirements, Jun. 14, 2002, 1169 pages.
IEEE Std 802.15.4™-2015, "IEEE Standard for Low-Rate Wireless Networks," LAN/MAN Standards Committee of the IEEE Computer Society, (Revision of IEEE Std 802.15.4-2011), Dec. 5, 2015, 708 pages.
Jeon, et al., "LTE with listen-before-talk in unlicensed spectrum," 2015 IEEE International Conference on Communication Workshop (ICCW), Workshop on LTE in Unlicensed Bands: Potentals and Challenges, Jun. 8-12, 2015, 5 pages.
Kazemian, et al., "Real time network policy checking using header space analysis," 10th USENIX Symposium on Networked Systems Design and Implementation, 2013, pp. 99-111.
LTE-U Forum and T-Mobile US, Inc. Letter re "Office of Engineering and Technology and Wireless Telecommunications Bureau Seek Information on Current Trends in LTE-U and LAA Technology—ET Docket No. 15-105," Sep. 9, 2015, 12 pages.
LTE-U Forum Companies, "LTE-U CSAT Procedure" TS V1.0, Oct. 2015, 7 pages.
Qualcomm Technologies, Inc., "Qualcomm Research LTE in Unlicensed Spectrum: Harmonious Coexistence with Wi-Fi," Jun. 2014, 19 pages.
Wannstrom, "Carrier Aggregation Explained," 3GPP, Jun. 2013, 6 pages, Retrieved from the Internet: URL: http://www.3gpp.org/Carrier-Aggregation-explained.

* cited by examiner

Proximity Table : proximity/confidence

| Wi-Fi/eNB | eNB_1 | eNB_2 | eNB_3 | eNB_b | ... | eNB_B |
|---|---|---|---|---|---|---|
| AP_1 | 1/1 | 0/1 | 0/1 | | | |
| AP_2 | 0/1 | 0.8/1 | 0/1 | | | |
| AP_3 | 0/0.5 | 0.3/0.6 | 0.9/0.7 | | | |
| AP_w | | | | | | |
| ... | | | | | | |
| AP_W | | | | | | |

Activity Table : activity/type/confidence

| Wi-Fi/ time DATE 1 | Time1 00:00 | Time2 | Time3 | ... | Time t 24:00 |
|---|---|---|---|---|---|
| AP_1 | 1.1/A1/1 | 1.1/A1/1 | 0.5/A2/1 | | 0/-/1 |
| AP_2 | 0.5/A3/1 | 0.1/A2/1 | 0.5/A2/1 | | 0/-/1 |
| AP_3 | Y/-/0.4 | Y/-/0.6 | N/-/0.6 | | N/-/1 |
| AP_w | | | | | |
| ... | | | | | |
| AP_W | | | | | |

FIG. 8A
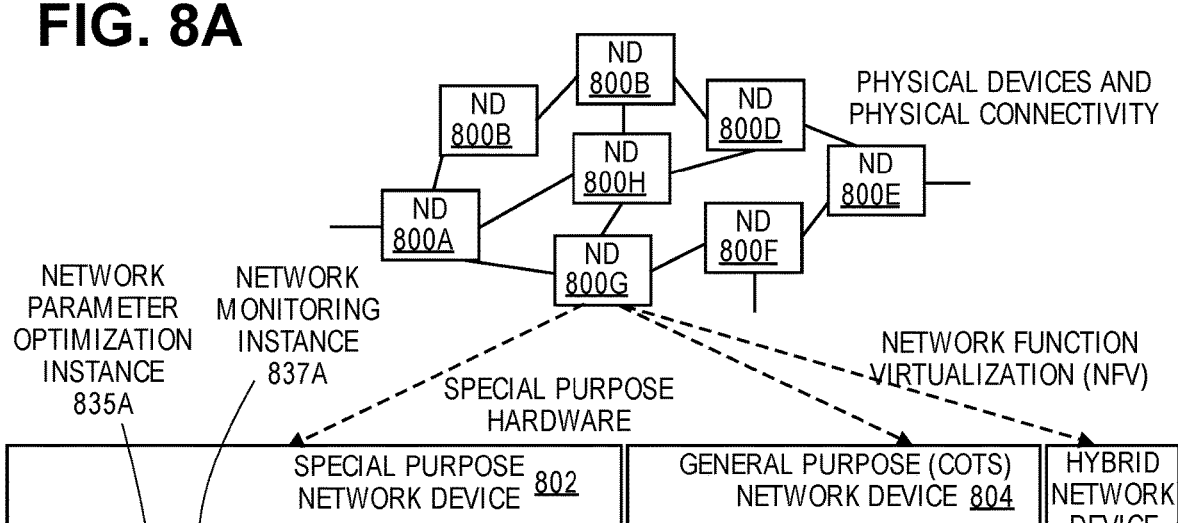
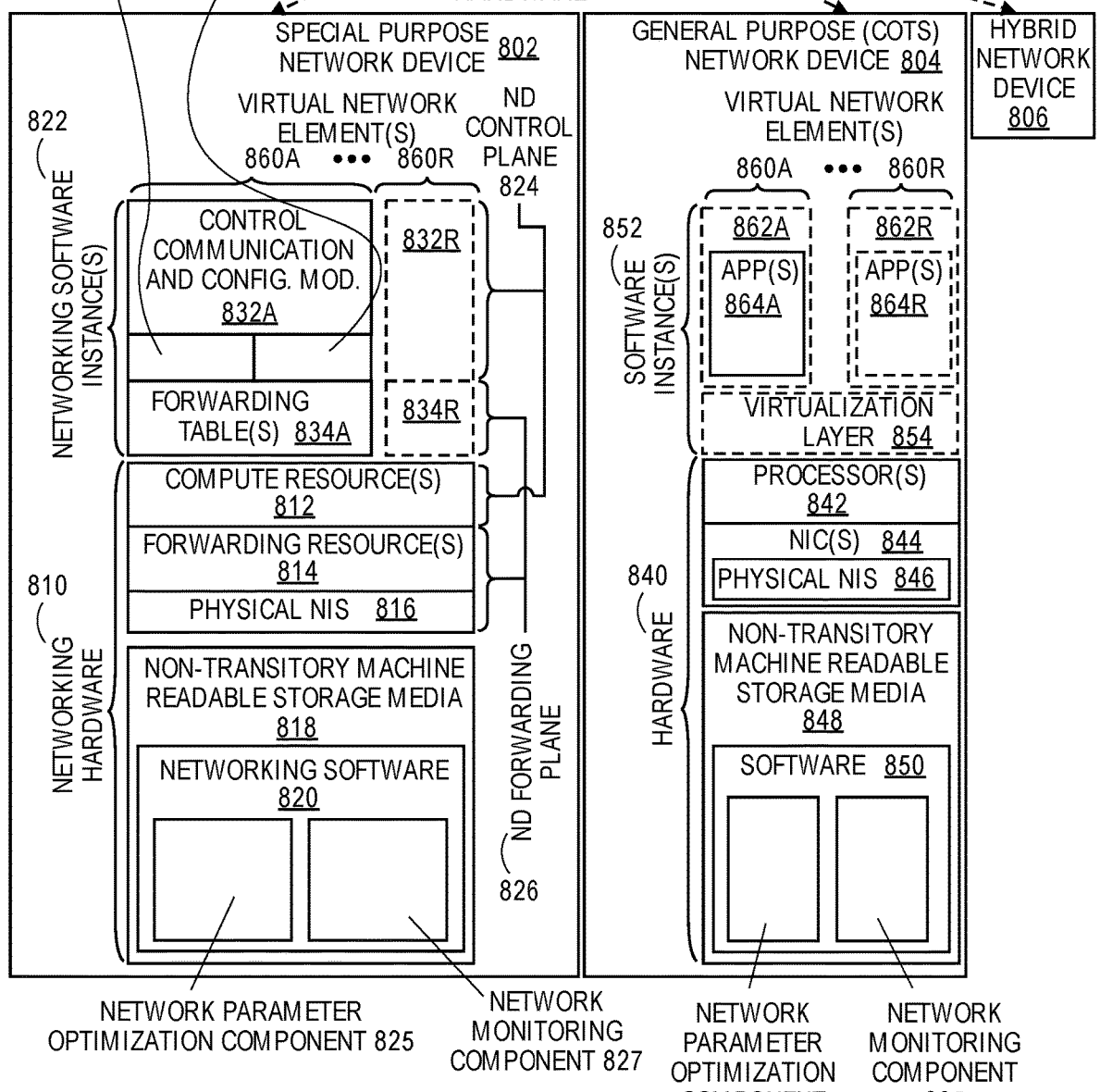
FIG. 8B

MONITOR AND PREDICT WI-FI UTILIZATION PATTERNS FOR DYNAMIC OPTIMIZATION OF THE OPERATING PARAMETERS OF NEARBY ENBS USING THE SAME UNLICENSED SPECTRUM

CROSS-REFERENCE TO RELATED APPLICATIONS

This application is a national stage of International Application No. PCT/IB2016/050618, filed Feb. 5, 2016, which is hereby incorporated by reference.

FIELD

Embodiments of the invention relate to the field of network optimization, and more specifically, to optimizing parameters settings of base stations that operate in an unlicensed spectrum.

BACKGROUND

Wi-Fi (e.g., based on Institute of Electrical and Electronics Engineers (IEEE) 802.11 standards) and other access technologies such as Bluetooth (e.g., based on IEEE 802.15.1 standards) and ZigBee (e.g., based on IEEE 802.15.4 standards) use the Industrial, Scientific, and Medical band (2.4 GHz ISM band) as well as the Unlicensed National Information Infrastructure band (5 GHz U-NII band). These bands are known as "unlicensed" or "licensed-exempt" bands.

Long Term Evolution (LTE) is a standard for wireless communication that operates in a licensed spectrum. LTE Unlicensed (LTE-U) (and LTE License Assisted Access (LTE-LAA), which is a standardized version of LTE-U) extends LTE to operate in an unlicensed spectrum such as the 5 GHz U-NII band. The goal of LTE-U and LTE-LAA is to offer better coverage and higher data rates compared to those of standard LTE in order to provide enhanced broadband experience for end users.

LTE-U and LTE-LAA technologies use the Carrier Aggregation (CA) technique in LTE-Advanced (LTE-A) to support transmission and reception over multiple component carriers (e.g., channels) in parallel. The unlicensed bands mentioned above (e.g., 5 GHz U-NII band) were previously not suitable for access technologies like LTE. However, with techniques such as CA and Supplemental Downlink (SDL), LTE has been extended to LTE-U/LAA and can now use the unlicensed spectrum. This extension is designed to increase spectral efficiency and hence the capacity of the LTE system. However, this extension may also interfere with the operation of other access technologies, such as Wi-Fi, in the unlicensed bands. A challenge for LTE-U/LAA is to ensure that it can coexist on a fair basis with other access technologies in the unlicensed spectrum.

SUMMARY

A method is implemented by a network device for determining parameter values for a base station of a cellular network. The base station operates in a wireless band that is shared with one or more wireless access points. The parameter values are to optimize network performance while ensuring fair coexistence between the base station and the one or more wireless access points. The method includes obtaining proximity information for the one or more wireless access points relative to the base station, obtaining activity information for the one or more wireless access points, and determining parameter values for the base station based on the proximity information and the activity information.

A method is implemented by a network management device for monitoring one or more wireless access points, where the one or more wireless access points operate in a wireless band that is shared with a base station of a cellular network operated by a network operator. The method includes instantiating one or more probes in a network operated by the network operator, obtaining data collected by the one or more probes, determining proximity information for the one or more wireless access points relative to the base station based on network planning data or the data collected by the one or more probes, and determining activity information for the one or more wireless access points based on the data collected by the one or more probes.

A network device is configured to determine parameter values for a base station of a cellular network. The base station operates in a wireless band that is shared with one or more wireless access points. The parameter values are to optimize network performance while ensuring fair coexistence between the base station and the one or more wireless access points. The network device includes a non-transitory machine-readable storage medium having stored therein a network parameter optimization component and a processor communicatively coupled to the non-transitory machine-readable storage medium. The processor is configured to execute the network parameter optimization component. The network parameter optimization component is configured to obtain proximity information for the one or more wireless access points relative to the base station, obtain activity information for the one or more wireless access points, and determine parameter values for the base station based on the proximity information and the activity information.

A network device is configured to monitor one or more wireless access points, where the one or more wireless access points operate in a wireless band that is shared with a base station of a cellular network operated by a network operator. The network device includes a non-transitory machine-readable storage medium having stored therein a network monitoring component and a processor communicatively coupled to the non-transitory machine-readable storage medium. The processor is configured to execute the network monitoring component. The network monitoring component is configured to instantiate one or more probes in a network operated by the network operator, obtain data collected by the one or more probes, determine proximity information for the one or more wireless access points relative to the base station based on network planning data or the data collected by the one or more probes, and determine activity information for the one or more wireless access points based on the data collected by the one or more probes.

A non-transitory machine-readable storage medium has computer code stored therein that is to be executed by a set of one or more processors of a network device. The computer code, when executed by the network device, causes the network device to perform operations for determining parameter values for a base station of a cellular network. The base station operates in a wireless band that is shared with one or more wireless access points. The parameter values are to optimize network performance while ensuring fair coexistence between the base station and the one or more wireless access points. The operations include obtaining proximity information for the one or more wireless access points relative to the base station, obtaining activity information for the one or more wireless access points, and determining parameter values for the base station based on the proximity information and the activity information.

A non-transitory machine-readable storage medium has computer code stored therein that is to be executed by a set of one or more processors of a network device. The computer code, when executed by the network device, causes the network device to perform operations for monitoring one or more wireless access points, where the one or more wireless access points operate in a wireless band that is shared with a base station of a cellular network operated by a network operator. The operations include instantiating one or more probes in a network operated by the network operator, obtaining data collected by the one or more probes, determining proximity information for the one or more wireless access points relative to the base station based on network planning data or the data collected by the one or more probes, and determining activity information for the one or more wireless access points based on the data collected by the one or more probes.

BRIEF DESCRIPTION OF THE DRAWINGS

The invention may best be understood by referring to the following description and accompanying drawings that are used to illustrate embodiments of the invention. In the drawings:

FIG. 8A illustrates connectivity between network devices (NDs) within an exemplary network, as well as three exemplary implementations of the NDs, according to some embodiments.

FIG. 8B illustrates an exemplary way to implement a special-purpose network device, according to some embodiments.

DESCRIPTION OF EMBODIMENTS

Figure 1:
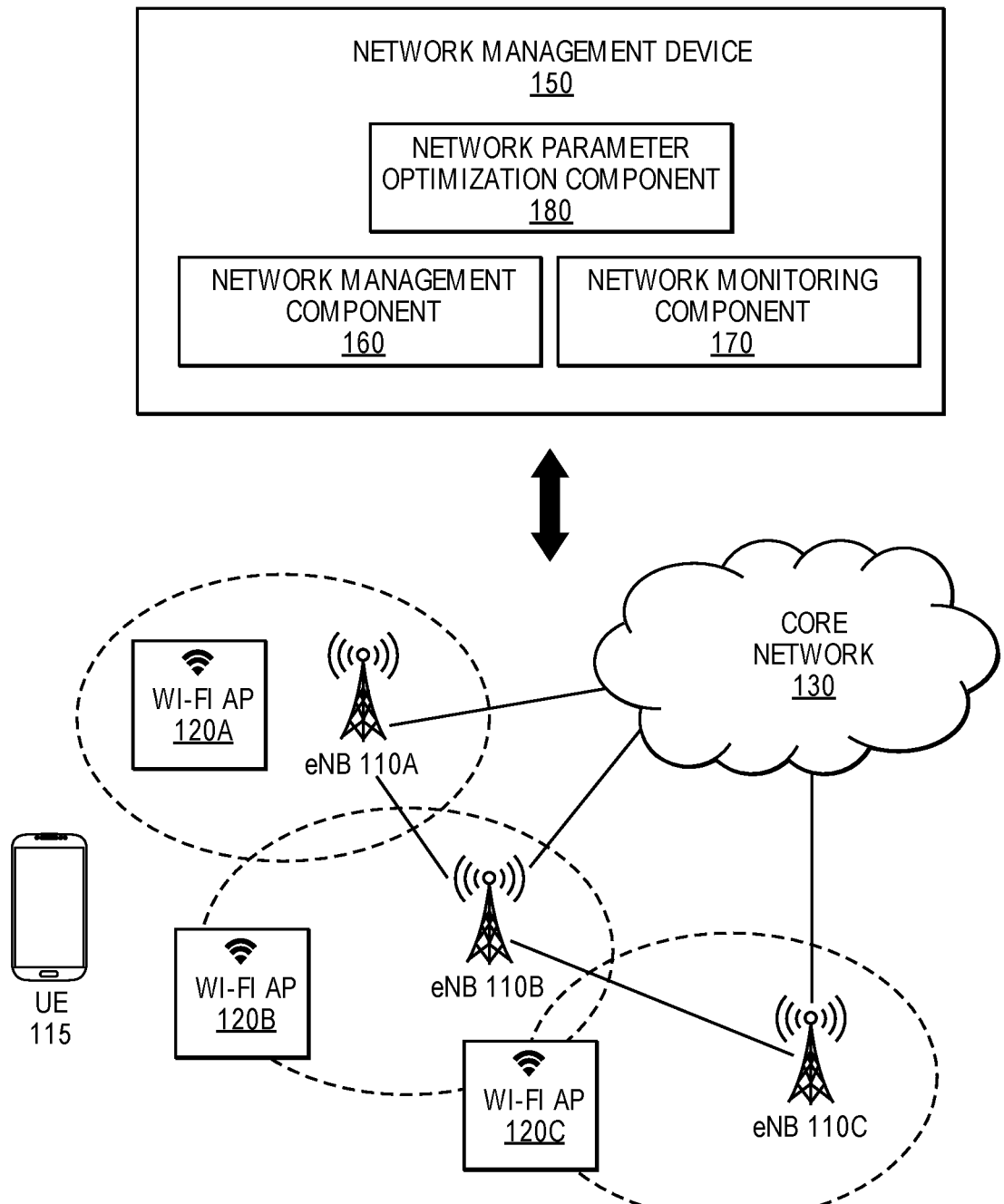
FIG. 1 is a diagram of a telecommunications system in which embodiments can be implemented, according to some embodiments.

The following description describes methods and apparatuses for dynamically optimizing the parameter values of base stations that are capable of operating in an unlicensed spectrum. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Long Term Evolution in unlicensed spectrum (LTE-U) (and LTE License Assisted Access (LTE-LAA), which is a standardized version of LTE-U) is a proposal for the use of LTE radio communications technology in an unlicensed spectrum, such as the 5 GHz band used by Wi-Fi. A challenge for LTE-U/LAA is to ensure that it can coexist on a fair basis with other access technologies in the unlicensed spectrum.

LTE-U/LAA may rely on channel selection techniques in order to assure fair coexistence with Wi-Fi. In channel selection, the base station (e.g., a small cell base station such as an LTE-U or LTE-LAA evolved Node B (eNB)) chooses the cleanest channel based on sensing the Radio Frequency (RF) environment. If a clean channel is available, the base station transmits on that channel. When a clean channel is not available, the base station may rely on other techniques such as Carrier-Sensing Adaptive Transmission (CSAT) or Listen Before Talk (LBT) techniques to fairly share the channel. It should be noted that even if a channel is clean, CSAT/LBT techniques may still be used (with different parameter values).

CSAT uses an adaptive duty cycle approach for transmission. In CSAT, the base station senses the level of interference on a channel during off periods, and modifies the ON time of transmission per cycle based on the sensed level of interference. During the OFF periods, the base station only transmits LTE-U Discovery Signals (LDS) to help user equipment (UE) to synchronize with the LTE-U cell. CSAT is already deployed in some LTE-U systems and is accepted in the United States, South Korea, India, China, and other parts of the world. However, network operators in these countries are facing some push-back with regard the deployment of LTE-U/LAA technology due to concerns about the potential impact of LTE-U/LAA technology on Wi-Fi performance. Also, some studies indicate that CSAT may hinder Wi-Fi quality more than initially thought.

Various CSAT parameter values can be modified to adjust CSAT operation. Some examples of CSAT parameters include a maximum channel usage parameter, a minimum channel usage parameter, a maximum continual on time parameter, and an occupancy threshold parameter. The maximum channel usage parameter defines the maximum channel usage. The minimum channel usage parameter defines the minimum channel usage. The maximum continual on time parameter defines the duty cycle length for CSAT. The occupancy threshold parameter defines a threshold energy level above which a detected energy level must exceed before a channel is classified as being occupied.

LBT checks for the presence of other occupants in a channel before transmitting. In LBT, a base station that wants to transmit in a channel has to first detect the energy level of the channel to determine the level of interference. If the detected energy level of the channel is below a threshold value, then the base station can transmit in that channel. LBT is a technique that is commonly used in Wi-Fi. Wi-Fi uses a Media Access Control (MAC) protocol called Carrier Sense Multiple Access with Collision Avoidance (CSMA/CA). With CSMA/CA, a node that wishes to transmit performs a Clear Channel Assessment (CCA) to determine if a channel is busy or idle. If the node senses that the channel is busy, it performs random back-off. Optionally, a node may exchange Request-to-Send (RTS) and Clear-to-Send (CTS) messages with other nodes to avoid hidden station problems. Wi-Fi defines a fixed energy detection threshold value that is used to detect the start of a valid Wi-Fi signal (called signal detect CCA) or to detect any signal (called energy detect CCA). LTE-U/LAA may adopt similar LBT techniques to ensure fair coexistence with Wi-Fi.

Various LBT parameter values can be modified to adjust LBT operation. Some examples of LBT parameters include an energy detection threshold parameter (for CCA), a multi-carrier operation parameter, a maximum length Transmit Opportunity (TXOP) parameter, a minimum contention window size parameter, and a maximum contention window size parameter.

The energy detection threshold parameter for CCA defines a threshold energy level above which a detected energy level must exceed before a channel is classified as being busy. The energy detection threshold for CCA should be set appropriately in order to effectively protect nearby transmissions. Raising the energy detection threshold too high is not desirable because this may become practically equivalent to not implementing LBT (e.g., device will always think the channel is idle). At the same time, lowering the energy detection threshold too low may overprotect and lower the chances for the device to transmit. The optimal setting for the energy detection threshold may depend on the network topology and surrounding environment.

The multi-carrier operation parameter defines settings for carrier aggregation. In LTE-A Carrier Aggregation, each aggregated carrier is referred to as a Component Carrier (CC). The simplest way to arrange aggregation is to use contiguous CCs within the same operating frequency band (commonly referred to as intra-band contiguous). However, this may not always be possible due to operator frequency allocation scenarios. The value of the multi-carrier operation parameter can be adjusted to use channels during carrier aggregation that are not being used by a Wi-Fi transmission.

The maximum length Transmit Opportunity (TXOP) parameter defines the maximum length of a bounded time interval during which a node can send as many frames as possible.

The minimum contention window size parameter defines the initial contention window size used for backoff. The maximum contention window size parameter defines the maximum size of the contention window. The values of these parameters can be adjusted Dynamically adjusting the values of CSAT and/or LBT parameters based on knowledge of nearby Wi-Fi access points can help improve network performance and to minimize interference with Wi-Fi transmissions. For example, adjusting the duty cycle length in CSAT may help achieve better network performance and minimize interference with Wi-Fi transmissions (e.g., longer duty cycle may be used in the absence of Wi-Fi transmissions and shorter duty cycles in the presence of Wi-Fi transmissions). As another example, adjusting the energy detection threshold value in LBT may help achieve better network performance and minimize interference with Wi-Fi transmissions. As yet another example, adjusting the value of the maximum length TXOP parameter may help achieve better network performance and minimize interference with Wi-Fi transmissions (e.g., a longer TXOP can be used in the absence of Wi-Fi transmissions). The optimal parameter values for CSAT and/or LBT may depend on a variety of factors. However, existing LTE-U/LAA systems use fixed parameter values or determine the parameter values solely based on sensing the air interface. These parameter values may lead to sub-optimal network performance and cause unnecessary interference with Wi-Fi transmissions.

Embodiments described herein optimize parameter values (e.g., CSAT parameter values and LBT parameter values) for a base station (e.g., an eNB) based on information about nearby wireless access points (e.g., Wi-Fi access points). The information about nearby wireless access points may include proximity information for the wireless access points relative to the base station and activity information for the wireless access points. The proximity information may include information regarding the distance between the base station and a given wireless access point and/or an estimated level of interference between the base station and a given wireless access point. The activity information may include information regarding a predicted level of activity of a given wireless access point at a given time/day/year and/or the traffic type transmitted by the wireless access point along with a confidence value. The information about nearby wireless access points can be determined based on data collected from various probes deployed in a network operator's network. This information may provide a more complete picture of the wireless access points that are nearby the base station than solely relying on sensing the air interface. Embodiments described herein leverage this real-time and predicted information about nearby wireless access points to configure the base station with optimal parameter values that provide good network performance, while ensuring fair coexistence with the wireless access points.

Some embodiments will be described in the context of a telecommunications system where the base stations are eNBs that employ LTE-U/LAA and where the wireless access points are Wi-Fi access points that employ IEEE 802.11 standards (e.g., 802.11n or 802.11ac). However, it should be understood that unless indicated otherwise, the terms "base station" and "wireless access points" as used herein are not intended to be specific to or otherwise be limited to any particular access technology. More generally, the embodiments described herein are applicable in an environment where the base stations share an unlicensed spectrum with the wireless access points.

FIG. 1 is a diagram of a telecommunications system in which embodiments can be implemented, according to some embodiments. As shown, the telecommunications system includes eNBs 110A-C, a UE 115, a core network 130, Wi-Fi access points 120A-C, and a network management device 150. An eNB 110 is a network device that communicates with UEs (e.g., UE 115) over an air interface (e.g., using radio communications). In one embodiment, the eNBs employ LTE-U or LTE-LAA. Each eNB 110 may communicate with UEs 115 within a particular geographic area (e.g., a "small cell"). The eNBs 110A-C are connected to the core network 130 and can facilitate communications between the UE 115 and the core network 130. The core network 130 may provide connectivity to other packet data networks such as the Internet. In one embodiment, the core network 130 is an Evolved Packet Core (EPC) network. The UE 115, eNBs 110A-C, and the core network 130 may collectively form a cellular network (e.g., an LTE network). The cellular network (or a subset thereof) may be under the control of a network operator (e.g., an LTE operator). For simplicity and clarity, the cellular network is depicted as having three eNBs 110A-C and a single UE 115. However, it should be understood that the cellular network can include any number of eNBs 110 and that more than one UE 115 can connect to the cellular network.

The Wi-Fi access points 120A-C provide connectivity to a Wireless Local Area Network (WLAN). The Wi-Fi access points 120A-C may employ IEEE 802.11 standards and typically operate in the unlicensed spectrum. The Wi-Fi access points 120A-C may or may not be under the control of the network operator. Traditionally, eNBs 110 operate in a licensed spectrum. However, with the introduction of LTE-U/LAA, operation of the eNBs 110 may extend to the unlicensed spectrum occupied by Wi-Fi devices (e.g., Wi-Fi access points 120). As a result, the eNBs 110 and the Wi-Fi access points 120 may interfere with each other, which can impact the performance of the network.

The network management device 150 is a network device that manages various aspects of the network operator's network. The network management device 150 may be under the control of the network operator. As shown, the network management device 150 includes a network management component 160, a network monitoring component 170, and a network parameter optimization component 180. Although the diagram shows the various components as being implemented by a single network device (i.e., the network management device 150), in some embodiments, the functionality of the respective components can be distributed over one or more network devices.

The network management component 160 is responsible for managing the cellular network. In one embodiment, the network management component 160 provides an interface (e.g., Application Programming Interface (API)) for configuring the parameter values for the eNBs 110. For example, the network management component may provide an API for configuring the CSAT and LBT parameter values of the eNBs 110.

The network monitoring component 170 is responsible for monitoring the network operator's network. The network monitoring component is operable to instantiate and configure probes (physical or virtual probes) in the network operator's network to collect real-time data pertaining to the network traffic that passes through various points of the network operator's network. An example of such probes is described in U.S. application Ser. No. 14/745,058 (titled, "A Method for Optimized Placement of Service-Chain-Monitoring Probes"), which is hereby incorporated in its entirety by reference. The network monitoring component 170 may utilize a Software Defined Networking (SDN) controller and a cloud manager to monitor various points in the network operator's network. The network operator's network may include the cellular network, as well as a cloud data center, a Wide Area Network (WAN), and other types of network infrastructures. In one embodiment, the network monitoring component 170 uses the data collected by the probes to generate a Wireless Activity Map (WAM). A WAM may include proximity information for Wi-Fi access points 120 relative to eNBs 110 and activity information for the Wi-Fi access points 120. The proximity information may include information about which Wi-Fi access points 120 (if any) are located near a given eNB 110 (and thus might interfere with the eNB 110). The activity information may include information regarding which Wi-Fi access points 120 are likely to be actively transmitting at a given point in time. The activity information may also include the traffic type that the Wi-Fi access points 120 are likely to transmit at a given point in time (e.g., real-time traffic or non-real-time traffic). The WAM may also include confidence levels that rate the accuracy of the information in the WAM. The WAM may thus provide a good picture of the Wi-Fi access points 120 near a given eNB 110, as well the transmission behaviors of the Wi-Fi access points 120 near the given eNB 110 at a given time. The WAM is described in additional detail below with reference to FIGS. 2 and 3. The network monitoring component 170 may provide the WAM to the network parameter optimization component 180 so that the network parameter optimization component 180 can use this information to optimize the parameter values of the eNBs 110.

The network parameter optimization component 180 is responsible for optimizing the parameter values of the eNBs 110. The network parameter optimization component 180 is operable to obtain the proximity information and activity information generated by the network monitoring component 170 (e.g., the WAM) and use this information to determine the optimal parameter values for the eNBs 110. For example, the network parameter optimization component 180 may use the WAM to determine optimal parameter values for CSAT or LBT. The network operator may define what is considered optimal (e.g., based on domain expertise and/or policy). For example, the optimal parameter values for the eNBs 110 may be the parameter values that optimize a set of Key Performance Indicators (KPIs) defined by the network operator. The KPIs may include performance indicators for the network operator's fixed and/or mobile network, as well as performance indicators for the network operator's Wi-Fi access points 120 and third party Wi-Fi access points 120. The network parameter optimization component 180 may provide the optimal parameter values to the network management component 160 so that the network management component 160 can configure the eNBs 110 with the optimal parameter values. The network parameter optimization component 180 can periodically determine updated optimal parameter values for the eNBs 110 based on obtaining updated proximity information and activity information from the network monitoring component 170, and push these parameter values to the eNBs 110 via the network management component 160. Although the network parameter optimization component 180 is shown as being implemented by the network management device 150, in other embodiments, the functionality of the network parameter optimization component 180 can be distributed across the network. For example, each eNB 110 may implement its own instance of the network parameter optimization component to optimize its own parameter values.

Figure 2:
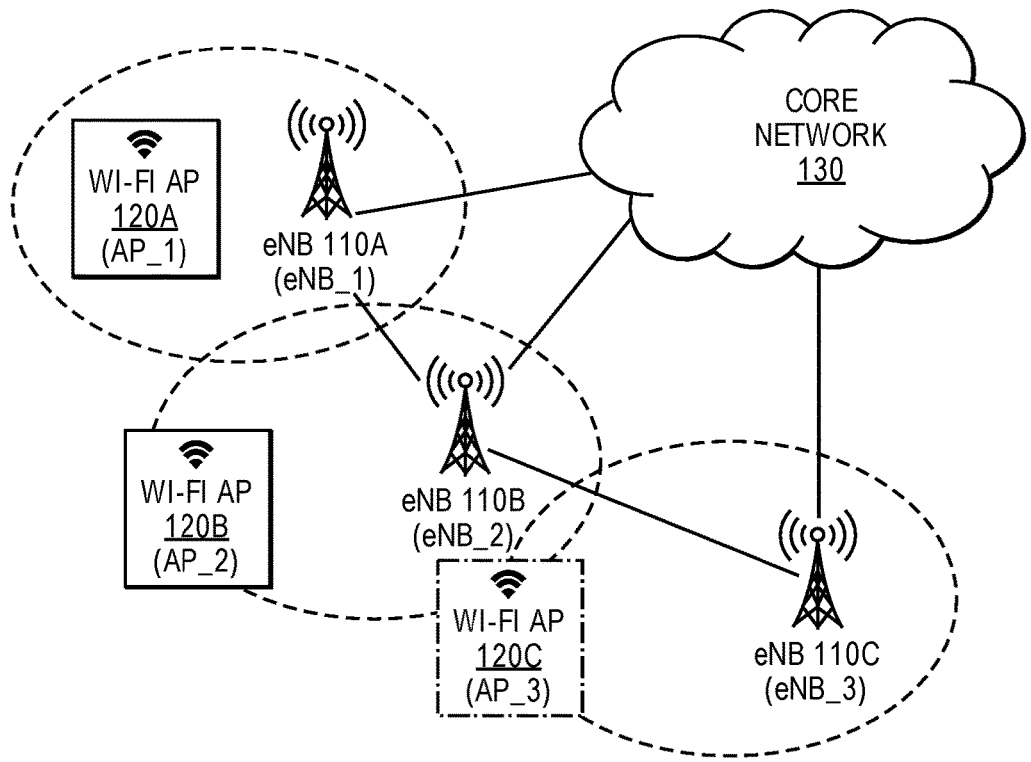
FIG. 2 is a diagram of a proximity table of a Wireless Activity Map (WAM), according to some embodiments.

FIG. 2 is a diagram of a proximity table of a WAM, according to some embodiments. As discussed above, a WAM may include proximity information for Wi-Fi access points 120 relative to eNBs 110. In one embodiment, the proximity information may be expressed as a proximity table. The proximity table includes proximity information for Wi-Fi access points 120 (AP_1 to AP_W) relative to eNBs 110 (eNB_1 to eNB_B). Each row in the proximity table represents a Wi-Fi access point 120 and each column in the proximity table represents an eNB 110. An entry in row r and column c of the proximity table indicates proximity information for the Wi-Fi access point 120 represented by row r relative to the eNB 110 represented by column c. An entry in the proximity table may include an estimated level of interference/proximity between the Wi-Fi access point 120 and the eNB 110. In this example, the estimated level of interference is indicated as a value between 0 and 1, where a value of 0 indicates no possible interference and a value of 1 indicates the highest level of interference. An entry may also include an indication of a confidence level of the accuracy of the estimated level of interference. In this example, the confidence level is indicated as a value between 0 and 1, where a value of 0 indicates the lowest level of confidence and a value of 1 indicates the highest level of confidence. The confidence level can be determined based on how the information was determined (e.g., what data was used to determine the information). For example, the entry corresponding to AP_3 and eNB_2 is denoted as 0.3/0.6. This indicates that the estimated level of interference between AP_3 and eNB_2 is 0.3 (on a scale of 0 to 1) and that the confidence level of the accuracy of the estimated level of interference is 0.6 (on a scale of 0 to 1). Other entries of the proximity table can be interpreted in a similar fashion.

The set of eNBs 110 to be included in the proximity table is known, as the network operator has knowledge of the eNBs 110. For the Wi-Fi access points 120, the proximity table can begin with an initial set of Wi-Fi access points 120 that are known to the operator (e.g., the W-Fi access points 120 that were deployed by the network operator) and this set can grow as the network operator detects the presence of other Wi-Fi access points 120 that were not deployed by the network operator (e.g., via the network monitoring component 170). The network operator may have knowledge of the geographic coordinates of the Wi-Fi access points 120 that it deployed, which may result in a confidence value of 1. In the example, AP_1 and AP2 are operated by the network operator and thus the entries for these Wi-Fi access points 120 have confidence values of 1. On the other hand, AP_3 is not operated by the operator so the entries for this Wi-Fi access point 120 have lower confidence values. UE statistics may also be used by the network operator to learn the presence of nearby Wi-Fi access points.

Figure 3:
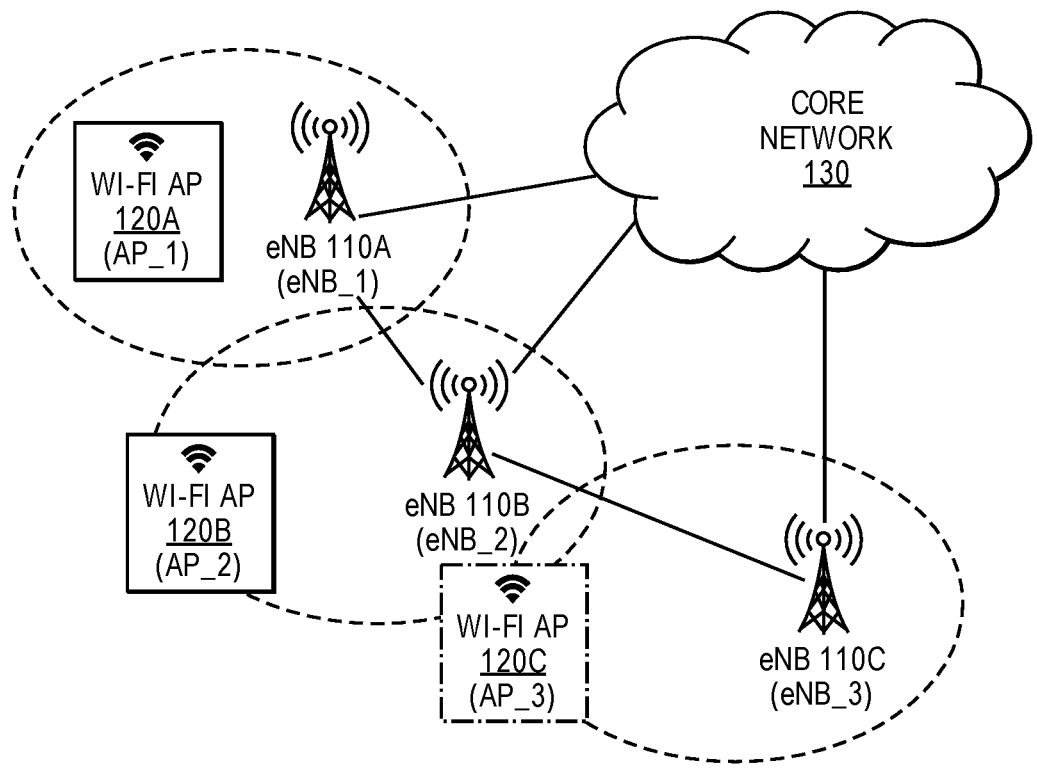
FIG. 3 is a diagram of activity tables of a WAM, according to some embodiments.

FIG. 3 is a diagram of activity tables of a WAM, according to some embodiments. As discussed above, a WAM may include activity information for Wi-Fi access points 120. In one embodiment, the activity information may be expressed as one or more activity tables. In one embodiment, a separate activity table is maintained per calendar day. In one embodiment, each activity table includes activity information for Wi-Fi access points 120 (AP_1 to AP_W) per time of day (Time_1 to Time_t). Each row in an activity table represents a Wi-Fi access point 120 and each column in an activity table represents a time of day. An entry in row r and column c of the activity table indicates activity information for the Wi-Fi access point 120 represented by row r at the time of day represented by column c. An entry in the activity table may include an indication of a predicted activity level of a given Wi-Fi access point 120 at a given time of day. In this example, the predicted activity level is indicated in terms of the amount of bandwidth consumed by the Wi-Fi access point (in Gbps) or as a yes/no value, where yes (Y) indicates that the Wi-Fi access point 120 is actively transmitting and no (N) indicates that the Wi-Fi access point 120 is not actively transmitting. An entry may also include an indication of a traffic type. In this example, the traffic type is denoted as A1, A2, or A3, where A1 indicates real-time traffic (such as Voice over Internet Protocol (VoIP) traffic), A2 indicates streaming traffic, and A3 indicates file download traffic. A value of "–" indicates that the traffic type information is not available. An entry may also include an indication of a confidence level of the accuracy level of the predicted activity level and/or the traffic type. In this example, the confidence level is indicated as a value between 0 and 1, where a value of 0 indicates the lowest level of confidence and a value of 1 indicates the highest level of confidence. The confidence level can be determined based on how the information was determined (e.g., what data was used to determine the information). For example, the entry corresponding to AP_2 and Time_2 is denoted as 0.1/A2/1. This indicates that the predicted activity level of AP_2 at Time_2 is 0.1 Gbps, that the traffic type is streaming traffic, and that the confidence level of the accuracy of the predicted activity level and/or traffic type is 1 (on a scale of 0 to 1). Other entries of the activity table can be interpreted in a similar fashion.

The activity table can begin with an initial set of Wi-Fi access points 120 that are known to the operator (e.g., the Wi-Fi access points 120 that were deployed by the network operator) and this set can grow as the network operator detects the presence of other Wi-Fi access points 120 that were not deployed by the network operator (e.g., via the network monitoring component 170). In the example, AP_1 and AP2 are operated by the network operator and thus the entries for these Wi-Fi access points have confidence values of 1. On the other hand, AP_3 is not operated by the operator so the entries for this Wi-Fi access point 120 have lower confidence values.

It should be noted that the WAM may include information other than proximity information and activity information. For example, the WAM may include information regarding scheduled maintenance, blacklisted/rogue/compromised Wi-Fi access points 120, future anticipated associations due to a scheduled event, priorities as a result of policy decision, and other information related to Wi-Fi access points 120. Also, it should be noted that the arrangement of information in the WAM is provided by way of example and not limitation. Other embodiments may arrange the information in a different manner and/or using different data structures.

The network monitoring component 170 may generate the WAM based on operator data (e.g., network planning data from network planning/installation phase) and data collected from various probes deployed in the network operator's network. These probes may include probes on eNBs 110, probes on UEs 115, probes on Wi-Fi access points 120, and other types of probes (e.g., probes on customer premises equipment (CPE) and probes on Broadband Network Gateways (BNGs)).

Probes on eNBs 110 are probes that collect data from eNBs 110. For example, a probe on an eNB 110 can collect LTE-U/LAA signal interference data logs/counters for that eNB 110 and Received Signal Strength Indicator (RSSI) levels on Wi-Fi channels. This data can be used to determine the presence of nearby Wi-Fi access points 120 (proximity and/or interference), as well as their transmission behavior in time (during the day, week, month, and year). In some cases it is not possible to determine whether interference was caused by a Wi-Fi access point 120 or another eNB 110. In this case, the confidence level for the information is lower. In one embodiment, interference caused by a Wi-Fi access point 120 can be distinguished from interference caused by another eNB 110 based on detected RSSI levels. In one embodiment, the ability to decode the preamble of a Wi-Fi signal can help determine whether the interference is being caused by a Wi-Fi access point 120 or another eNB 110.

Probes on UEs 115 are probes that collect data from UEs 115. For example, a probe on a UE 115 can collect information about the Wi-Fi access points 120 that the UE 115 has observed or has connected to. In one embodiment, the network management component 160 collects the data from the eNBs 110 and/or UEs 115.

Probes on Wi-Fi access points 120 are probes that collect data from Wi-Fi access points 120. For example, a probe on a Wi-Fi access point 120 may collect data transmission statistics of that Wi-Fi access point 120. This data can be used to learn and predict the transmission behavior of the Wi-Fi access point 120 in time (during the day, week, month, and year). For example, the transmission behavior of a Wi-Fi access point 120 in a shopping mall with fixed opening hours can be learned using machine learning techniques (e.g., using a neural network). In this case, the transmission behavior may indicate that the Wi-Fi access point 120 has higher levels of activity when the shopping mall is open and has lower levels of activity when the shopping mall is closed. The transmission behavior of Wi-Fi access points 120 in a home, a coffee shop, and other Wi-Fi hot spots can also be learned in a similar fashion. In one embodiment, a probe on a Wi-Fi access point 120 can collect layer 4-7 (L4-7) data transmission statistics (e.g., using Deep Packet Inspection (DPI)) and this data can be used to determine the type of traffic that the Wi-Fi access point 120 is transmitting over time. For example, the data transmission statistics may be used to determine that a given Wi-Fi access point 120 transmits 25 Mbps of streaming data from 7 μm to 9 μm and 1.5 Mbps real-time traffic (e.g., video conference call traffic) from 7 am to 8 am, and the rest of the time it does not transmit.

Other types of probes such as probes on CPEs and probes on BNGs can also collect data from their respective attachment points. Since data collected by these types of probes are not directly from a Wi-Fi access point 120, the network operator may need to perform further analysis to determine if the data collected by these probes is related to a Wi-Fi transmission. As such, the confidence level for information determined based on such data is usually lower than when the information is determined based on data collected directly from a probe on a Wi-Fi access point 120.

Figure 4:
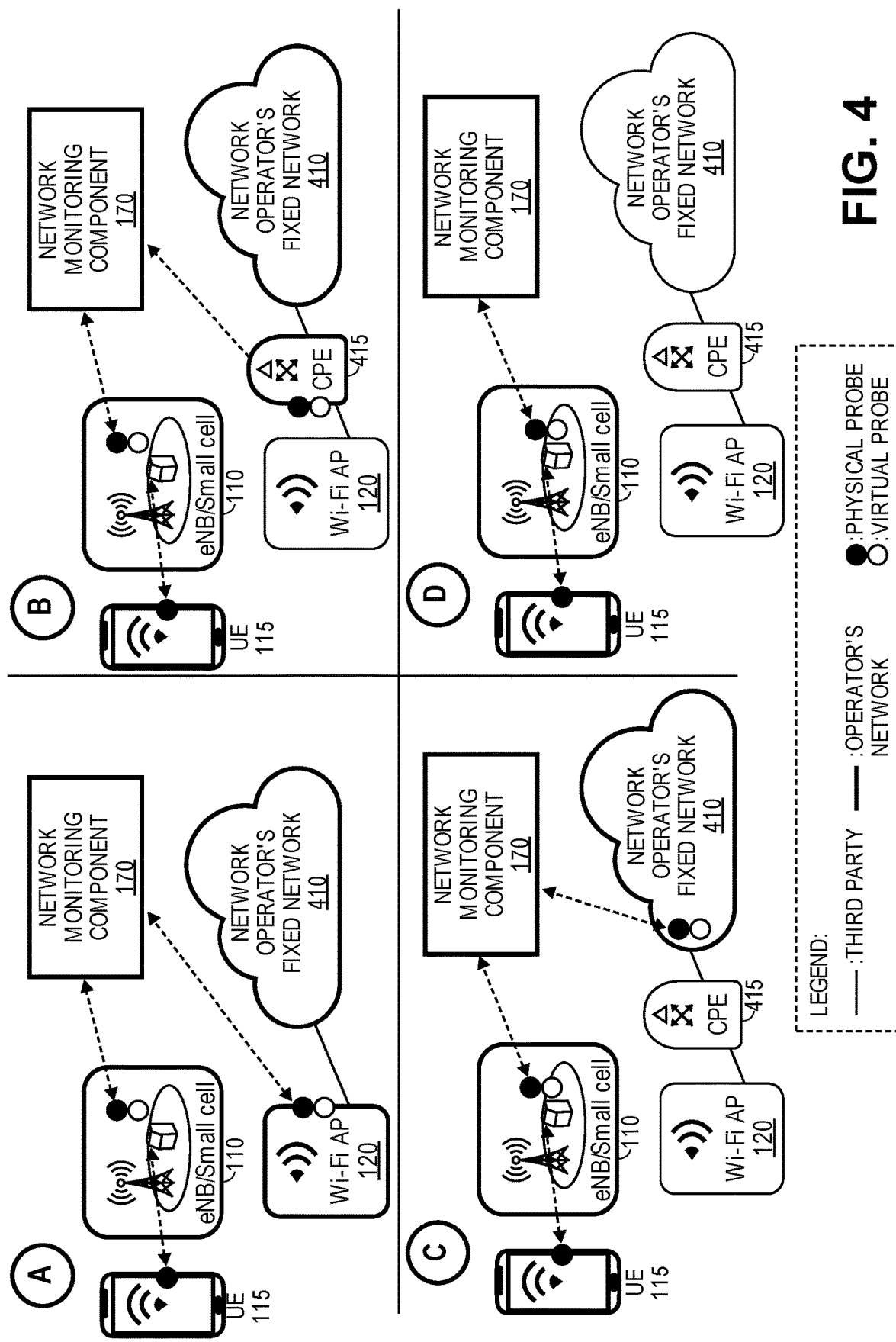
FIG. 4 is a diagram illustrating various probe deployment scenarios, according to some embodiments.

FIG. 4 is a diagram illustrating various probe deployment scenarios, according to some embodiments. In the drawings, the bolded elements are operated by the network operator and the non-bolded elements are operated by a third party. Four different probe deployment scenarios are shown in the diagram (scenario A, B, C, and D). The probe deployment scenarios are provided by way of example and not limitation. It should be understood that probe deployment scenarios other than the scenarios described herein can be used to collect data from the network. The network monitoring component may use the data collected from the probes to generate the WAM (e.g., proximity table and activity table) or similar information.

In scenario A, the network operator (e.g., an LTE network operator) operates and has access to the network operator's fixed network 410, the eNB (or small cell base station) 110, the Wi-Fi access point 120, and the UE 115. The network monitoring component 170 thus has access to the probes (e.g., physical and/or virtual probes) on the eNB 110 and the probes on the Wi-Fi access point 120. The network monitoring component 170 can use data collected from the probes on the Wi-Fi access point 120 to learn the transmission behavior of Wi-Fi access point 120 (and when the Wi-Fi air interface is used). In one embodiment, data collected from the probes on the Wi-Fi access point 120 can be used to determine whether the Wi-Fi access point's 120 performance has been affected by the presence of interference from a non-LBT network device (e.g., an eNB 110 operating in CSAT mode). This information can help improve the accuracy of the proximity table of the WAM. The network monitoring component can also leverage the data collected from the probes on the Wi-Fi access point 120 to determine how the location of the Wi-Fi access point 120 (which the network operator knows) impacts the interference level between the Wi-Fi access point 120 and the eNB 110 (e.g., this may be useful for the proximity table of the WAM).

In scenario B, the network operator operates and has access to the network operator's fixed network 410, the eNB 110, the UE 115, and the CPE 415 (e.g., a residential gateway). However, the operator does not operate the Wi-Fi access point 120. The network monitoring component has access to the probes (e.g., physical and/or virtual probes) on the eNB 110, the UE 115, and the CPE 415. The network monitoring component 170 can use the data collected from the CPE 415 to determine the existence and transmission behavior of Wi-Fi access point 120. However, not all of the network traffic that passes through the CPE 415 is necessarily traffic that was transmitted by the Wi-Fi access point 120. For example, in some cases, a television that streams video content could be directly connected to the CPE 415. In that case, any video streaming traffic from the television should not be counted as belonging to the Wi-Fi access point 120. As such, the network monitoring component 170 may need to filter through the data collected from the CPE 415 to determine which parts of the traffic belongs to the Wi-Fi access point 120. In one embodiment, the network monitoring component 170 can inspect the Media Access Control (MAC) address specified in the network traffic and compare it to the MAC address of the Wi-Fi access point 120 to determine whether the network traffic is from the Wi-Fi access point 120. However, this does not necessarily mean that the end device used the air interface of the Wi-Fi access point 120 (e.g., the end device could have been connected to the Wi-Fi access point using a wired connection). In one embodiment, retransmission (layer 4 information) and queuing patterns at the CPE 415 can be used to distinguish between network traffic from a wired connection and network traffic from a wireless connection. For example, the presence of bandwidth bursts greater than the maximum bandwidth of the Wi-Fi access point 120 could suggest that the network traffic is from a wired connection (assuming that the maximum bandwidth of the Wi-Fi access point 120 is known). The presence of periodic bursts of errors may suggest that the network traffic is from a wireless connection. In one embodiment, fingerprinting techniques can be used to classify network traffic as being from an end user device that typically communicates via a Wi-Fi access point 120. Fingerprinting techniques and location services data (e.g., Internet Protocol (IP) address location mapping databases) could be used to determine the location of the end user device and/or the Wi-Fi access point 120. If the network operator knows the location of the CPE 415 and the eNB 110, then the location of the Wi-Fi access point 120 with respect to the eNB 110 can be determined depending on the location of the Wi-Fi access point 120 with respect to the CPE 415. In the case that the Wi-Fi access point is not collocated with the CPE 415, correlation techniques can be used to determine the Wi-Fi access point's 120 location relative to the eNB 110.

In scenario C, the network operator operates and has access to the network operator's fixed network 410, the eNB 110, and the UE 115. However, the network operator does not operate the Wi-Fi access point 120 or the CPE 415. The network monitoring component has access to the probes (e.g., physical and/or virtual probes) on the eNB 110, the probes on the UE 115, and the probes at the edge of the fixed network 410 (e.g., on a BNG). In this case, the network monitoring component uses data collected from probes at the edge of the fixed network 410 to determine the existence and transmission behavior of Wi-Fi access point 120. In one embodiment, Deep Packet Inspection (DPI) techniques (L4-7) and/or location services data (e.g., IP address location mapping databases) can be used to determine whether network traffic is from the Wi-Fi access point 120 and to determine the location of the end user device. In general, this information is less accurate than information determined using data collected directly from the Wi-Fi access point 120 and/or data collected from the CPE 415, as correlating data collected from the edge of the fixed network 410 with the Wi-Fi access point 120 may not be completely accurate. However, the data collected from the edge of the fixed network 410 may still be useful to determine at a high level the potential existence of Wi-Fi access points 120 near a certain area and the periods during the day when Wi-Fi access points 120 are actively transmitting.

In scenario D, the network operator operates and has access to the eNB 110 and the UE 115. However, the network operator does not operate the fixed network 410, the Wi-Fi access point 120, or the CPE 415. In this case, the network monitoring component uses data collected from the probes (e.g., physical and/or virtual probes) on the eNB 110 and the UE 115 (e.g., eNB and UE data logs, statistics, and counters) to determine the existence and transmission behavior of Wi-Fi access point 120. In one embodiment, the RSSI levels detected at the eNB 110 can be used to determine the potential existence of Wi-Fi access points 120 near the eNB 110.

In all of the above scenarios, once the network traffic is identified as being Wi-Fi traffic, the network monitoring component 170 can use data collected from L4-7 probes to also determine the traffic type (e.g., real-time or streaming traffic).

The network operator may have knowledge of the location of the network elements (e.g., the Wi-Fi access points 120, eNB 110, CPE 415, and/or BNG) it owns and/or operates (e.g., recorded during the network planning or installation phase). In the case that the network operator operates the Wi-Fi access points 120, then the proximity information of the WAM can be determined with high confidence based on the known locations of the Wi-Fi access points 120 and the eNBs 110. In the case that the network operator does not operate the Wi-Fi access points 120, the proximity information of the WAM can be inferred based on other means, for example inspecting network traffic that passes further down the network (e.g., at the CPE 415 and/or BNG). For example, DPI and/or fingerprinting techniques could be used to obtain L4-7 information about the network traffic coming from the Wi-Fi access points 120 and this information could be used to map the Wi-Fi access points 120 to potential geographical coordinates. In the case of moving Wi-Fi access points 120 and/or eNBs 110 (e.g., in trains), machine learning techniques may be used to learn the movement pattern of the Wi-Fi access points 120 and/or eNBs 110 in order to locate them. Information about the existence of Wi-Fi access points 120 can also be exchanged between network operators.

Figure 5:
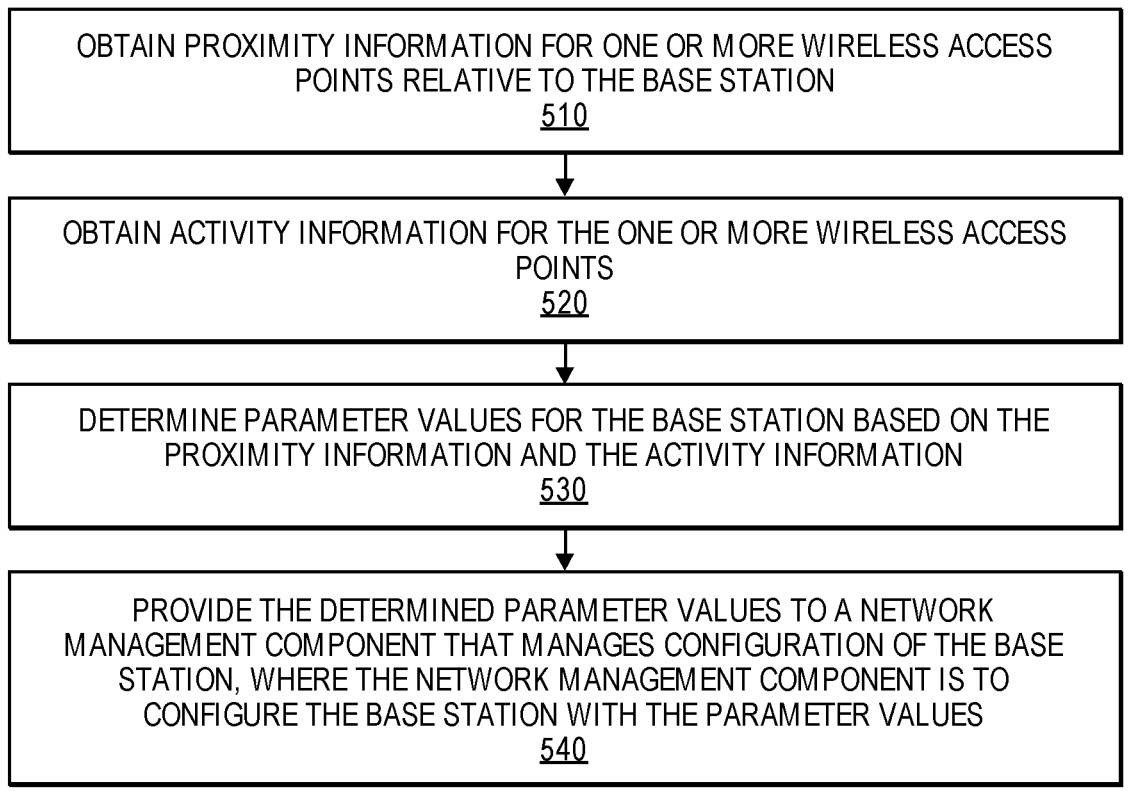
FIG. 5 is a flow diagram of a process for determining optimal parameter values for a base station, according to some embodiments.

FIG. 5 is a flow diagram of a process for determining optimal parameter values for a base station, according to some embodiments. The process determines parameter values for a base station of a cellular network (e.g., eNB 110 employing LTE-U or LTE-LAA), where the base station operates in a wireless band that is shared with one or more wireless access points (e.g., Wi-Fi access point 120 employing IEEE 802.11 standards). In one embodiment, the process may be implemented by a network device (e.g., network parameter optimization component 180 of network management device 150). The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The network device obtains proximity information for one or more wireless access points relative to the base station (block 510). In one embodiment, the proximity information includes an estimated level of interference between the base station and a given wireless access point from the one or more wireless access points. In one embodiment, the proximity information includes a confidence level of the accuracy of the estimated level of interference between the base station and the given wireless access point. In one embodiment, the proximity information includes a proximity table of a WAM. In one embodiment, the proximity information is obtained from a network monitoring component.

The network device obtains activity information for the one or more wireless access points (block 520). In one embodiment, the activity information includes an indication of a predicted level of activity at a given time of a given wireless access point from the one or more wireless access points. In one embodiment, the activity information includes an indication of a predicted traffic type of the given wireless access point at the given time. In one embodiment, the activity information includes an indication of a confidence level of the accuracy of the predicted level of activity of the given wireless access point at the given time. In one embodiment, the activity information includes one or more activity tables of a WAM. In one embodiment, the activity information is obtained from a network monitoring component (e.g., network monitoring component 170).

The network device determines the parameter values for the base station based on the proximity information and the activity information (block 530). In one embodiment, the parameter values include CSAT parameter values. In one embodiment, the parameter values include LBT parameter values. In one embodiment, the LBT parameter values include an energy detection threshold value, a minimum contention window size value, and a maximum contention window size value. In one embodiment, the parameter values for the base station are determined using machine learning techniques (e.g., using a machine learning system). The machine learning system can be trained using feedback of the network performance. For example, in one embodiment, the network device obtains a first network performance indicator that indicates a level of network performance before the base station configuration is updated with the new parameter values and a second network performance indicator that indicates a level of network performance after the base station is re-configured with the new parameter values. The network device can continually train the machine learning system in this way to learn how to determine parameter values that optimize network performance based on the first network performance indicator and the second network performance indicator.

The network device may then provide the determined parameter values to a network management component that manages configuration of the base station so that the network management component can configure the base station with the parameter values (block 540). The network device may dynamically determine updated parameter values for the base station (using a similar process as described above) in response to receiving updated proximity information or updated activity information. In this way, the network device can periodically determine optimal parameter values for the base station based on information about wireless access points near the base station.

Figure 6:
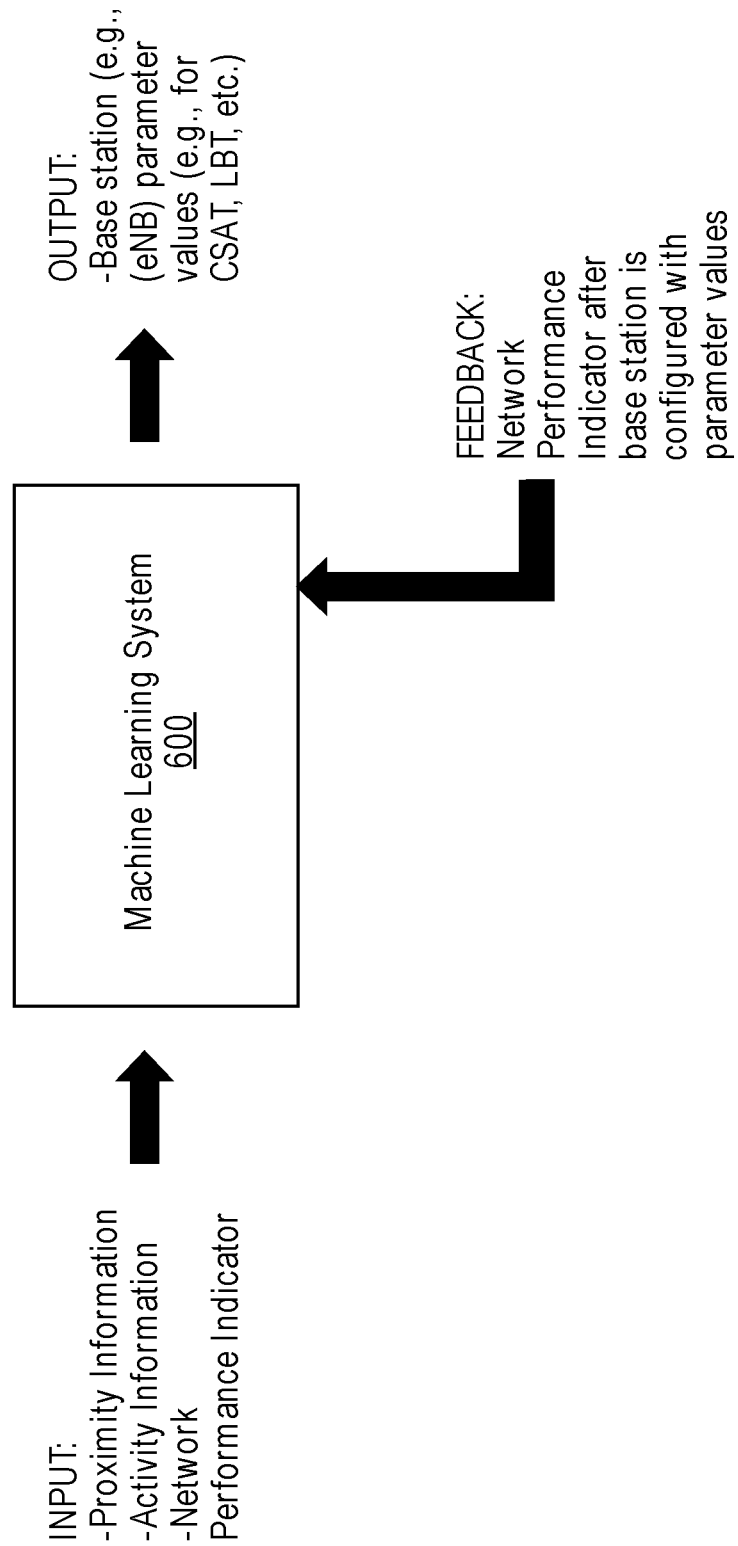
FIG. 6 is a block diagram of a machine learning system for determining optimal parameter values for a base station, according to some embodiments.

FIG. 6 is a block diagram of a machine learning system for determining optimal parameter values for a base station, according to some embodiments. The machine learning system 600 takes proximity information (for wireless access points relative to the base station) and activity information (for the wireless access points) as input and generates base station (e.g., eNB 110) parameters values (e.g., CSAT or LBT parameter values) as output. The machine learning system 600 is trained to determine the base station parameter values that optimize network performance. The definition of what is considered optimal network performance can be defined and configured by the network operator, as desired (e.g., based on domain expertise and/or policy). In one embodiment, the machine learning system 600 has a self-learning mechanism to learn from its past decisions. For example, a network performance indicator (e.g. a set of KPIs) of the network may be provided as input to the machine learning system 600. The machine learning system generates base station parameter values as output and the base station is configured with these base station parameter values (e.g., via the network management component 160). After the base station is configured with the base station parameter values, a network performance indicator of the network (indicating network performance after the base station is configured with the parameter values) is provided as feedback to the machine learning system 600. The machine learning system 600 may then compare the two network performance indicators (the network performance indicator provided as input and the network performance indicator provided as feedback) to determine whether the base station parameter values it generated improved performance or degraded performance (and by how much). Based on this information, the machine learning system 600 can learn from its past mistakes and accordingly adjust future outputs to optimize network performance. In one embodiment, the machine learning system 600 is implemented as part of the network parameter optimization component 180. The machine learning system 600 can be implemented using various types of machine learning techniques. For example, in one embodiment, the machine learning system 600 is implemented using neural networks.

Figure 7:
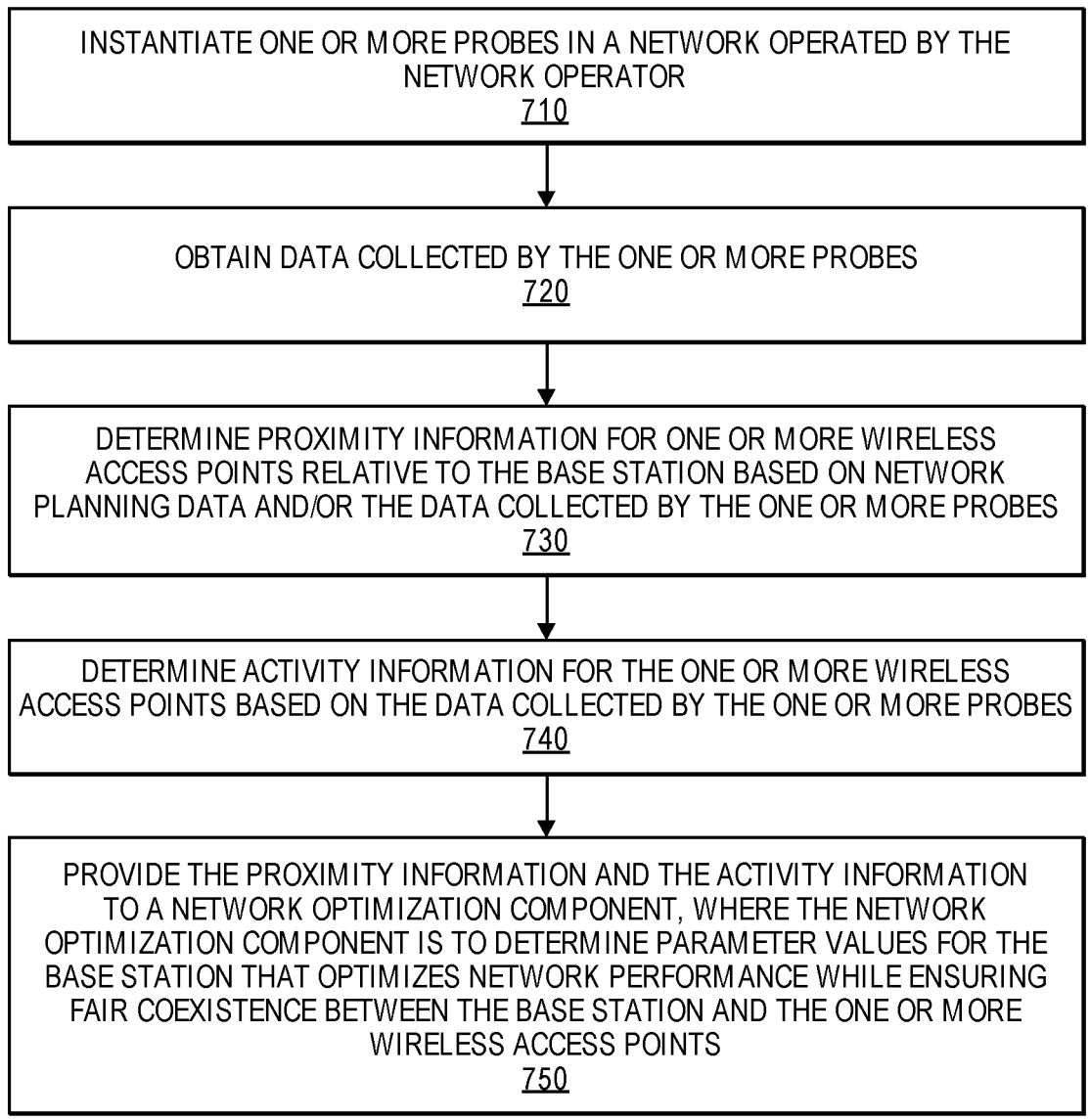
FIG. 7 is a flow diagram of a process for detecting and monitoring one or more wireless access points, according to some embodiments.

FIG. 7 is a flow diagram of a process for detecting and monitoring one or more wireless access points, according to some embodiments. The process detects and monitors one or more wireless access points (e.g., Wi-Fi access point 120 employing IEEE 802.11 standards), where the one or more wireless access points operate in a wireless band that is shared with a base station of a cellular network (e.g., eNB 110 employing LTE-U or LTE-LAA) operated by a network operator. In one embodiment, the process may be implemented by a network device (e.g., network monitoring component 170 of network management device 150).

The network device instantiates one or more probes in a network operated by the network operator (block 710). In one embodiment, the one or more probes include a base station probe that collects data associated with a base station operated by the network operator. In one embodiment, the data associated with the base station includes data regarding network traffic that passes through the base station. In one embodiment, the data associated with the base station includes interference data per wireless band and/or interference data per wireless channel (as detected by the base station). In one embodiment, the one or more probes include a UE probe that collects data associated with a UE 115. In one embodiment, the data associated with the UE includes information regarding nearby wireless access points (e.g., wireless access points that the UE 115 has observed or connected to). In one embodiment, the one or more probes include a wireless access point probe that collects data associated with a wireless access point operated by the network operator. In one embodiment, the data associated with the wireless access point includes data regarding network traffic that passes through the wireless access point. In one embodiment, the one or more probes include a CPE probe that collects data associated with a CPE operated by the network operator. In one embodiment, the data associated with the CPE includes data regarding network traffic that passes through the CPE. In one embodiment, the one or more probes include a BNG probe that collects data associated with a BNG operated by the network operator. In one embodiment, the data associated with the BNG includes data regarding network traffic that passes through the BNG.

The network device obtains data collected by the one or more probes (block 720). The network device then determines proximity information for one or more wireless access points relative to the base station based on network planning data and/or the data collected by the one or more probes (block 730) and determines activity information for the one or more wireless access points based on the data collected by the one or more probes (block 740). The network planning data is data related to the planning/installation of the network operator's network. For example, in some cases, the network operator may have installed some or all of the wireless access points and thus have knowledge of the location (e.g., geographical coordinates) of those wireless access points. The network operator may also have knowledge of the location of the base station. The network operator may have recorded this type of network planning data during the network planning phase or when the wireless access points were installed. In one embodiment, the proximity information includes an estimated level of interference between the base station and a given wireless access point from the one or more wireless access points. In one embodiment, the proximity information includes a confidence level of the accuracy of the estimated level of interference between the base station and the given wireless access point.

In one embodiment, the proximity information includes a proximity table of a WAM. In one embodiment, the activity information includes an indication of a predicted level of activity of a given wireless access point from the one or more wireless access points at a given time. In one embodiment, the activity information includes an indication of a predicted traffic type of the given wireless access point at the given time. In one embodiment, the activity information includes an indication of a confidence level of the accuracy of the predicted level of activity of the given wireless access point at the given time. In one embodiment, the activity information includes one or more activity tables of a WAM. The proximity information and the activity information can be determined based on any of the techniques described above.

The network device may then provide the proximity information and the activity information to a network optimization component, where the network optimization component is to determine parameter values for the base station that optimizes network performance while ensuring fair coexistence between the base station and the one or more wireless access points (block 750).

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

Software 820 can include code such as network parameter optimization component 825 and network monitoring component 827, which when executed by networking hardware 810, causes the special-purpose network device 802 to perform operations of one or more embodiments of the present invention as part networking software instances 822 (network parameter optimization instance 835A and network monitoring instance 837A). For example, network parameter optimization component 825 may be executed to perform one or more of the operations of network parameter optimization component 180 and network monitoring component 827 may be executed to perform one or more of the operations of network monitoring component 170.

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the NIC(s) 844, as well as optionally between the instances 862A-R; in addition, this virtual switch may enforce network isolation between the VNEs 860A-R that by policy are not permitted to communicate with each other (e.g., by honoring virtual local area networks (VLANs)).

Software 850 can include code such as network parameter optimization component 863 and network monitoring component 865, which when executed by processor(s) 842, cause the general purpose network device 804 to perform operations of one or more embodiments of the present invention as part software instances 862A-R. For example, network parameter optimization component 863 may be executed to perform one or more of the operations of network parameter optimization component 180 and network monitoring component 865 may be executed to perform one or more of the operations of network monitoring component 170.

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 8C:
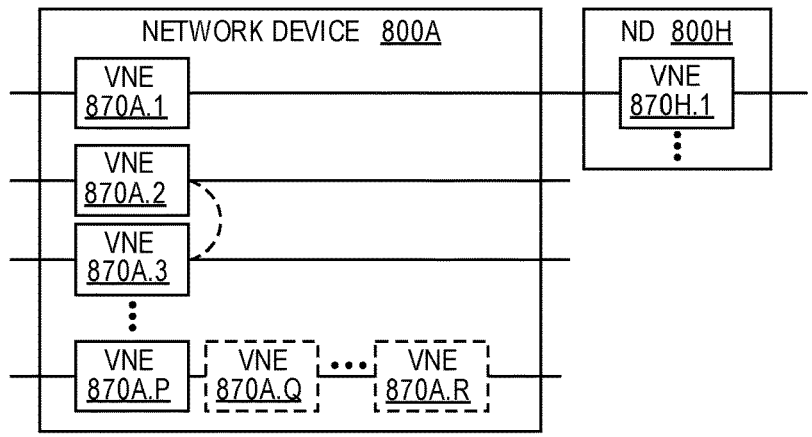
FIG. 8C illustrates various exemplary ways in which virtual network elements (VNEs) may be coupled, according to some embodiments.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premises equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
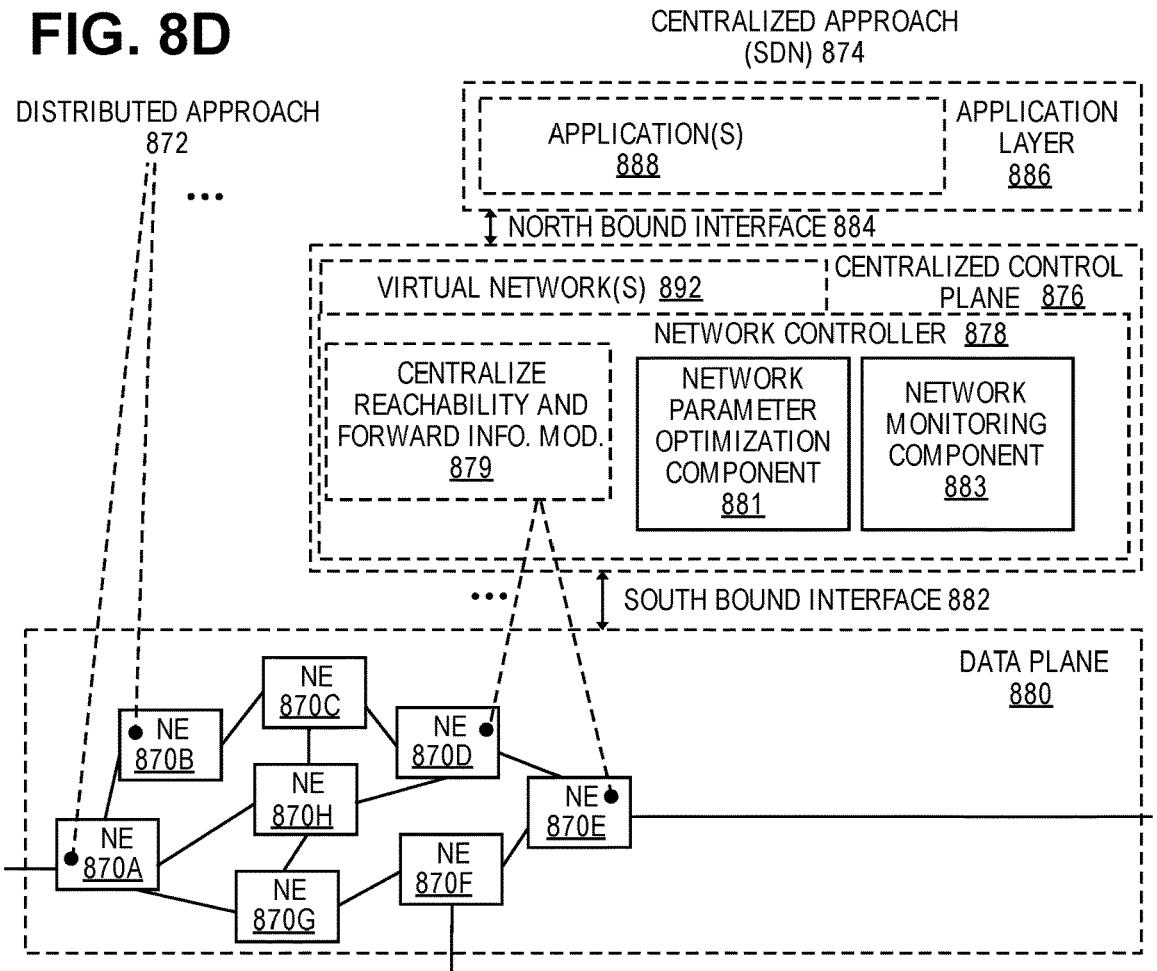
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 870A-H (e.g., the compute resource(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs. In one embodiment, the network controller 878 may include a network parameter optimization component 881 and network monitoring component 883 that when executed by the network controller 878, causes the network controller 878 to perform operations of one or more embodiments described herein above. For example, network parameter optimization component 881 may be executed to perform one or more of the operations of network parameter optimization component 180 and network monitoring component 883 may be executed to perform one or more of the operations of network monitoring component 170.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
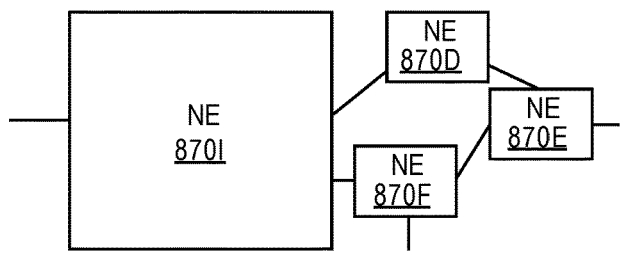
FIG. 8E illustrates the simple case of where each of the NDs implements a single NE, but a centralized control plane has abstracted multiple of the NEs in different NDs into (to represent) a single NE in one of the virtual network(s), according to some embodiments.
Figure 8F:
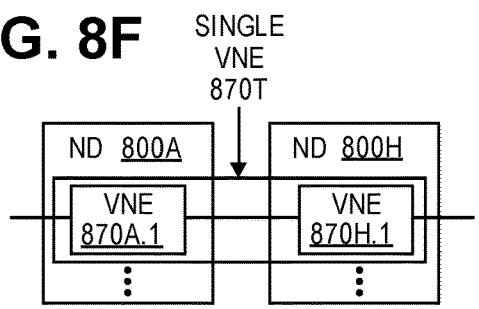
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 870I in one of the virtual network(s) 892 of FIG. 8D, according to some embodiments of the invention. FIG. 8E shows that in this virtual network, the NE 870I is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
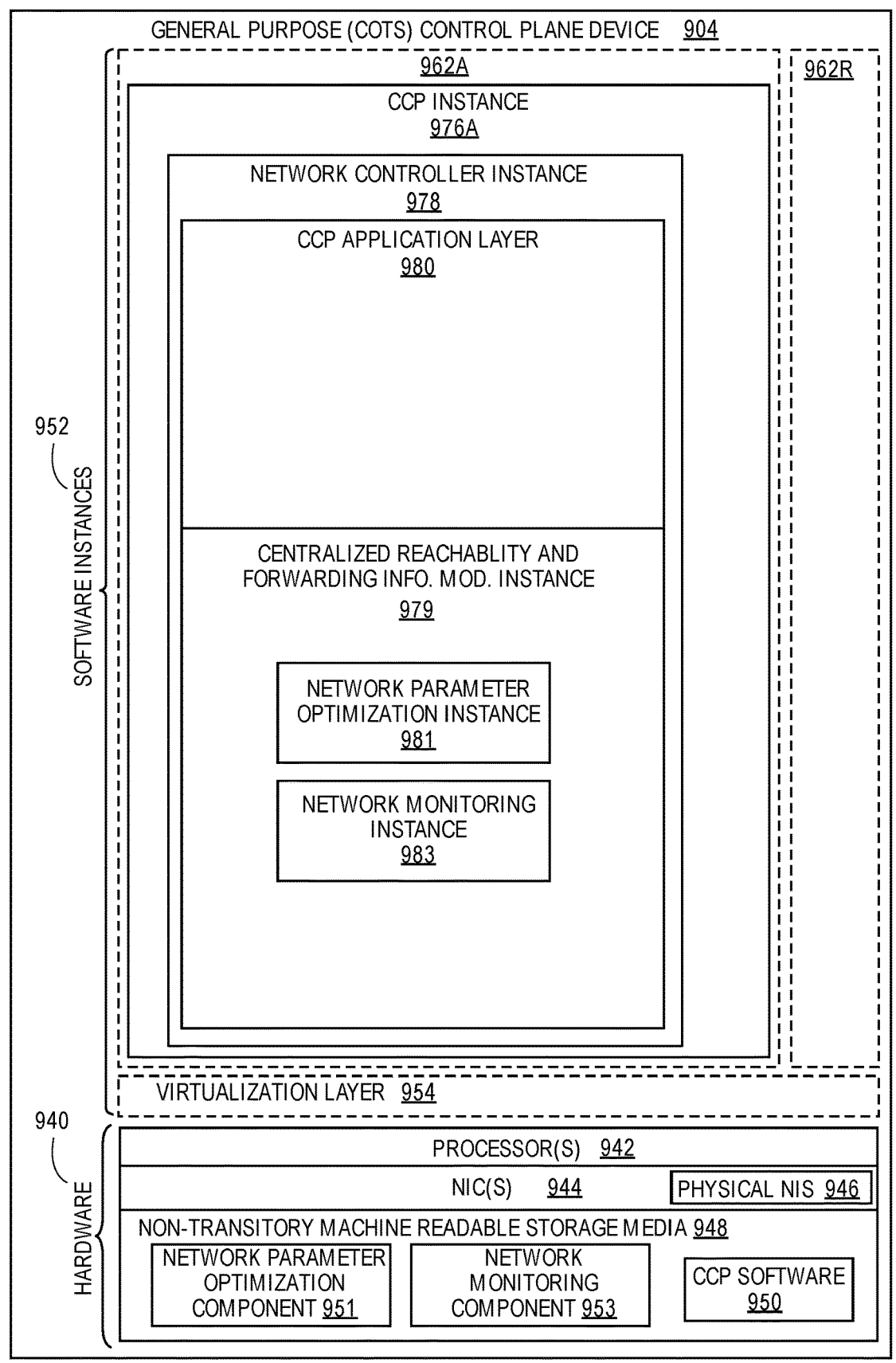
FIG. 9 illustrates a general purpose control plane device with centralized control plane (CCP) software, according to some embodiments.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950, a network parameter optimization component 951, and a network monitoring component 953.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view.

The network parameter optimization component 951 and network monitoring component 953 can be executed by hardware 940 to perform operations of one or more embodiments of the present invention as part of software instances 952 (e.g., network parameter optimization instance 981 and network monitoring instance 983). For example, network parameter optimization component 951 may be executed to perform one or more of the operations of network parameter optimization component 180 and network monitoring component 953 may be executed to perform one or more of the operations of network monitoring component 170.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network management device for monitoring one or more wireless access points, where the one or more wireless access points operate in a wireless band that is shared with a base station of a cellular network operated by a network operator, the method comprising:
   instantiating one or more probes in a network operated by the network operator;
   obtaining data collected by the one or more probes, wherein the one or more probes include a customer premises equipment (CPE) probe that collects data associated with a CPE;
   determining proximity information for the one or more wireless access points relative to the base station based on data collected by the one or more probes;
   filtering the data associated with the CPE collected by the CPE probe to distinguish between data pertaining to network traffic from a wireless access point behind the CPE and data pertaining to network traffic from wired devices behind the CPE, wherein the data pertaining to network traffic from the wireless access point behind the CPE is distinguished from the data pertaining to network traffic from wired devices behind the CPE using retransmission and queuing patterns of the CPE; and
   determining activity information for the one or more wireless access points based on the data collected by the one or more probes including the data pertaining to network traffic from the wireless access point behind the CPE.

2. The method of claim 1, wherein the one or more probes include a wireless access point probe that collects data associated with a given wireless access point from the one or more wireless access points, the given wireless access point operated by the network operator.

3. The method of claim 1, wherein the one or more probes include a base station probe that collects data associated with the base station.

4. The method of claim 3, wherein the data associated with the base station includes interference data per wireless band or interference data per wireless channel.

5. The method of claim 1, wherein the one or more probes include a user equipment (UE) probe that collects data associated with a UE.

6. The method of claim 1, wherein the one or more probes include a Broadband Network Gateway (BNG) probe that collects data associated with a BNG operated by the network operator.

7. A network device for monitoring one or more wireless access points, where the one or more wireless access points operate in a wireless band that is shared with a base station of a cellular network operated by a network operator, the network device comprising:
  a non-transitory machine-readable storage medium having stored therein a network monitoring component; and
  a processor communicatively coupled to the non-transitory machine-readable storage medium, the processor configured to execute the network monitoring component, wherein the network monitoring component is configured to instantiate one or more probes in a network operated by the network operator, obtain data collected by the one or more probes, wherein the one or more probes include a customer premises equipment (CPE) probe that collects data associated with a CPE, determine proximity information for the one or more wireless access points relative to the base station based on the data collected by the one or more probes, filter the data associated with the CPE collected by the CPE probe to distinguish between data pertaining to network traffic from a wireless access point behind the CPE and data pertaining to network traffic from wired devices behind the CPE, wherein the data pertaining to network traffic from the wireless access point behind the CPE is distinguished from the data pertaining to network traffic from wired devices behind the CPE using retransmission and queuing patterns of the CPE, and determine activity information for the one or more wireless access points based on the data collected by the one or more probes including the data pertaining to network traffic from the wireless access point behind the CPE.

8. The network device of claim 7, wherein the one or more probes include a wireless access point probe that collects data associated with a given wireless access point from the one or more wireless access points, the given wireless access point operated by the network operator.

* * * * *